United States Patent
Gouge et al.

(10) Patent No.: US 9,253,164 B2
(45) Date of Patent: Feb. 2, 2016

(54) DISTRIBUTION OF PORTIONS OF CONTENT

(75) Inventors: Christopher S Gouge, Redmond, WA (US); David Pokluda, Redmond, WA (US); Rajasekaran Rangarajan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 585 days.

(21) Appl. No.: 13/230,646

(22) Filed: Sep. 12, 2011

(65) Prior Publication Data

US 2013/0064370 A1 Mar. 14, 2013

(51) Int. Cl.
| | |
|---|---|
| *H04L 29/06* | (2006.01) |
| *H04N 21/232* | (2011.01) |
| *H04N 21/239* | (2011.01) |
| *H04N 21/262* | (2011.01) |
| *H04N 21/658* | (2011.01) |
| *H04N 21/6587* | (2011.01) |
| *H04N 21/845* | (2011.01) |

(52) U.S. Cl.
CPC .......... *H04L 63/0428* (2013.01); *H04N 21/232* (2013.01); *H04N 21/2393* (2013.01); *H04N 21/26258* (2013.01); *H04N 21/6581* (2013.01); *H04N 21/6587* (2013.01); *H04N 21/8456* (2013.01)

(58) Field of Classification Search
CPC .......... H04L 63/0428; H04N 21/6587; H04N 21/323; H04N 21/8456; H04N 21/6581; H04N 21/2393; H04N 21/26258
See application file for complete search history.

(56) References Cited

U.S. PATENT DOCUMENTS

| | | | |
|---|---|---|---|
| 7,058,722 B2 | 6/2006 | Ikami et al. | |
| 7,478,381 B2 | 1/2009 | Roberts et al. | |
| 7,539,686 B2 | 5/2009 | Shepard et al. | |
| 7,860,804 B2 | 12/2010 | Littrell | |
| 2007/0234343 A1* | 10/2007 | Gouge et al. | 717/174 |
| 2009/0144819 A1 | 6/2009 | Babbar et al. | |
| 2009/0204727 A1 | 8/2009 | Wang | |
| 2010/0318632 A1* | 12/2010 | Yoo et al. | 709/219 |
| 2011/0055312 A1 | 3/2011 | Purdy, Sr. | |
| 2011/0119547 A1 | 5/2011 | Kim et al. | |
| 2011/0184964 A1* | 7/2011 | Li | 707/756 |

OTHER PUBLICATIONS

Li, et al., "Mutualcast: An Efficient Mechanism for Content Distribution in a Peer-to-Peer (P2P) Network", Published on: Sep. 2004, Available at: http://research.microsoft.com/pubs/70097/tr-2004-100.pdf, 9 pages.
U.S. Appl. No. 13/230,607, filed Sep. 12, 2011.

* cited by examiner

*Primary Examiner* — Shewaye Gelagay
*Assistant Examiner* — Kendall Dolly
(74) *Attorney, Agent, or Firm* — Bryan Webster; Judy Yee; Micky Minhas

(57) ABSTRACT

Techniques for obtaining and providing a portion of content include receiving a request for the portion of the content, requesting and receiving one or more data chunks, processing the one or more data chunks, and providing one or more data blocks as the requested portion of the content. The processing may include validating, decrypting, and/or decompressing the one or more data chunks to create the one or more data blocks. Techniques for providing metadata and one or more data chunks may include receiving content and dividing the content into data blocks. Processing may then be performed on the data blocks to create data chunks, and the metadata may be generated from the processing. The metadata and one or more of the data chunks may be provided to a device.

20 Claims, 6 Drawing Sheets

DISTRIBUTION OF PORTIONS OF CONTENT

BACKGROUND

A large and growing number of devices are downloading only a portion of content that will be used by the device. These devices are subject to bandwidth and/or storage limitations and request portions of the content to meet these limitations. These devices request a range of bytes defining the portion of the content and download the content through a distribution channel including, for example, publishing services and network providers. During distribution, the content is often processed to provide security of the content and increase efficiency of the distribution. Such processing may include, for example, validating/verifying, encrypting, and/or compressing the content.

In this approach, the content is designed specifically for requirements of the distribution channel. For example, in order to distribute only a portion of the content while providing validation and/or verification, the content is designed specifically for the validation and/or verification requirements of the distribution channel. That is, during creation of the content, the content is designed to provide validation and/or verification at a specific data range. In this approach, it is difficult to distribute the content on a distribution channel that is not identical or similar to the distribution channel of the original design. In addition, in this approach, a device must request a portion of content based on ranges that are fixed during creation of the content.

There is an increasing opportunity to distribute a portion of content while providing validation, encryption, and/or compression of the content irrespective of design or specifics of content creation.

BRIEF DESCRIPTION OF THE DRAWINGS

The detailed description refers to the accompanying figures. In the figures, the left-most digit(s) of a reference number identifies the figure in which the reference number first appears. The use of the same reference number in different figures indicates similar or identical items.

DETAILED DESCRIPTION

As discussed above, there is an increasing opportunity to distribute a portion of content while providing validation, encryption, and/or compression of the content. For example, there in an increasing opportunity to distribute an arbitrary range of the content.

This disclosure describes techniques that, among other things, distribute a portion of content to one or more devices. These techniques may distribute an arbitrary range of the content while providing validation and protection of the content which is transparent to a requestor of the content. Furthermore, these techniques may distribute the content in a manner that is independent of the content format.

Aspects of this disclosure are directed to techniques for providing a portion of content. For instance, in one example, the portion of content (e.g., a portion of a media file, application, etc.) is distributed from a content source to a content requestor (e.g., a media player, installation application, etc.) via a content provider. In this example, the portion of the content is provided from the content source to the content provider as data chunks. These data chunks may be created at the content source by dividing the content into data blocks and performing processing on the data blocks. The processing may include, for example, creating validation information, encrypting the data blocks, and/or compressing the data blocks.

Meanwhile, in this example, the content requestor requests the portion of the content stored at the content source. Here, the content provider receives the request for the portion of the content, and determines the data blocks that correspond to the requested portion of the content. The content provider may then determine the data chunks that correspond to the data blocks. These determinations may be based on metadata indicating the processing performed at the content source when creating the data chunks. This metadata may be received from the content source. Thereafter, in this example, the content provider may request and receive the determined data chunks from the content source, and perform processing on the data chunks to recreate the data blocks. The processing may include, for example, validating, decrypting, and/or decompressing the data chunks to recreate the data blocks. In this example, the content provider may then combine these data blocks, and provide the combined data blocks to the content requestor as the requested portion of the content.

The sections below are examples provided for the reader's convenience and are not intended to limit the scope of the claims, nor the proceeding sections. Furthermore, the techniques described in detail below may be implemented in a number of ways and in a number of contexts. One example implementation and context is provided with reference to the following figures, as described below in more detail. However, the following implementation and context is but one of many.

Overview

Figure 1:
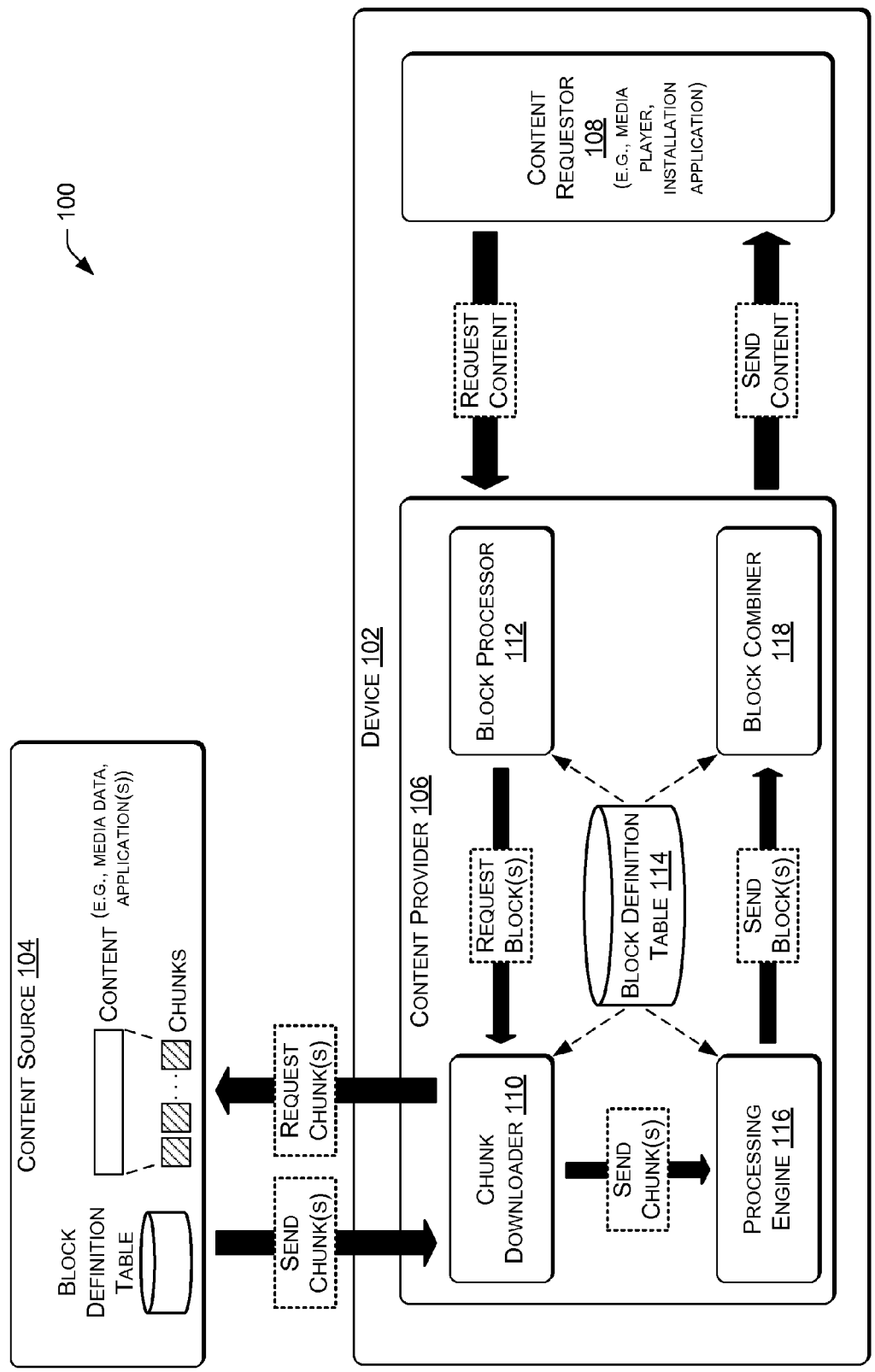
FIG. 1 illustrates an exemplary architecture usable to distribute portions of content.

FIG. 1 illustrates an exemplary architecture 100 in which techniques described herein may be implemented. Here, the techniques are described in the context of a device 102 to communicate with a content source 104 to provide and receive data. For instances, device 102 may communicate with content source 104 to request and/or receive content (e.g., media data, application(s)) and/or metadata stored in content source 104.

Device 102 may include a content provider 106 and a content requestor 108. Content provider 106 may perform operations to obtain content stored in content source 104 and provide the content to content requestor 108. Although illustrated as included within device 102, content provider 106 may also be located remotely from device 102. For example, content provider 106 may be implemented on one or more servers in a data center or cloud computing environment.

Content provider 106 may include a chunk downloader 110, a block processor 112, a block definition table 114, a processing engine 116, and a block combiner 118 to be described in further detail herein. Chunk downloader 110, block processor 112, processing engine 116, and block combiner 118 may be implemented as components of content provider 106. Although the following section describes, in part, techniques that are implemented by specific components of content provider 106, this implementation is but one of many. For example, the techniques may alternatively, or in addition, be implemented by one or more general purpose computers including one or more software and/or hardware components.

Content source 104 may include content and a block definition table. Content may be generated at content source 104 or at another device and provided to content source 104 to distribute to one or more devices, such as device 102. The content may include one or a combination of media data, application(s), software, etc. For instance, the content may be a video file, audio file, text file, and/or multimedia file to be provided over a network and presented on a device. Alternatively, or in addition, the content may be a content update to be distributed to devices. Meanwhile, the block definition table may include metadata associated with the content, such as information indicating processing performed on the content at content source 104 and/or other information relating to the content.

In one aspect of this disclosure, content source 104 may divide content (e.g., a media file, application, software, etc.) into a plurality of data blocks. Content source 104 may divide the content based on one or more predefined parameters or characteristics of the content or distribution channel. For instance, the content may be divided based on a predetermined number of bytes (e.g., 32 kilobytes (KB)) such that each data block includes 32 KB of data. The predetermined number of bytes may be set by a user associated with content source 104. Alternatively, or in addition, the content may be divided based on sections included in the content such that a data block ends or begins at the start or end of a section. These sections may be defined from chapters, bookmarks, songs, or other delimiters within the content.

The content may also be divided based on a type or format of the content. For example, video content may be divided into data blocks of 24 KB whereas application data may be divided into data blocks of 56 KB. The content may also be divided based on types of information included in the content. For instance, a video file may be divided into audio data blocks and video data blocks. Meanwhile, the content may also be divided based on the requirements of a distribution channel. In one example, the content is divided into smaller data blocks when the distribution channel includes one or more wireless networks (e.g., cellular networks, Wi-Fi® networks, Bluetooth® networks, etc.), and is divided into larger data blocks when the distribution channel includes networks which are not wireless. This example may satisfy different efficiency requirements of the networks.

Alternatively, or in addition, the content may be divided based on usage limitations of the distribution channel, such as bandwidth limitations. For example, the content may be divided into smaller data blocks when bandwidth usage is limited on the distribution channel, and may be divided into larger data blocks when bandwidth is unlimited on the distribution channel. This may account for networks which charge by data usage.

The content may also be divided based on expected ranges of data requested from a content requestor (e.g., an installation application). For instance, content source 104 may reference information associated with a specific file format which indicates a structure of the file format. This information may provide an indication of the types and/or location of content that may be requested from the content requestor.

In one embodiment, the content is divided based on an analysis of the content. Here, content source 104 may analyze the content to determine types of information or data included in the content. The analysis may determine that the content includes a first type of information or data (e.g., software which is identical to a previous version of the software), and a second type of information or data (e.g., software which is different from a previous version of the software). Thereafter, the content may be divided into a plurality of data blocks such that at least some of the data blocks include the first type of information or data and at least some of the data blocks include the second type of information or data. In one example, this allows the content to be divided and distributed so that only some of the data blocks need to be downloaded.

Meanwhile, content source 104 may perform processing on a plurality of data blocks to create a plurality of data chunks. The processing may include compressing some or all of the plurality of data blocks, encrypting some or all of the plurality of data blocks, and/or creating validation information for some or all of the plurality of data blocks. The compressing and encrypting may include generally known compression and encryption methods.

The processing may be different or the same for each of the plurality of data blocks. In one example, one or more first data blocks are processed with a first type of processing, and one or more second data blocks are processed with a second type of processing which is different than the first type of processing. The first type of processing may include a different type and/or order of compression, encryption, and/or validation information than the second type of processing, such as a different compression rate, compression method, encryption method, and/or hash algorithm.

The processing may result in one or more data chunks where each data chunk corresponds to a portion of one data block, an entirety of one data block, or more than an entirety of one data block. For example, a resulting data chunk may correspond to one data block in a one to one relationship. Alternatively, a resulting data chunk may correspond to a portion of one data block or more than one data block.

Meanwhile, a size of a resulting data chunk may be based on the processing and/or characteristics of the content. For example, the size of the resulting chunk may be based on the type of processing and/or an order of the processing when creating the chunk. The size may also be based on characteristics of the content, such as the compressibility of the content. In one example, processing is performed on one or more data blocks to create one or more data chunks which are equal in size to each other and/or the data blocks. In another example, the same, or a different processing, is performed on one or more data blocks to create one or more data chunks which are not equal in size to each other and/or the data blocks.

The size of a resulting data chunk may affect a position of the data chunk with respect to the original content. In one embodiment, when a resulting data chunk has a size that is equal to a size of the corresponding data block, the resulting data chunk also has a same position as the corresponding data block with respect to the original content. In other words, the position of a data chunk with respect to the original content may be the same as a position of a corresponding data block with respect to the original content. In another embodiment, when a resulting data chunk has a size that is not equal to a size of the corresponding data block, the resulting data chunk has a different position than the corresponding data block with respect to the original content.

Figure 2:
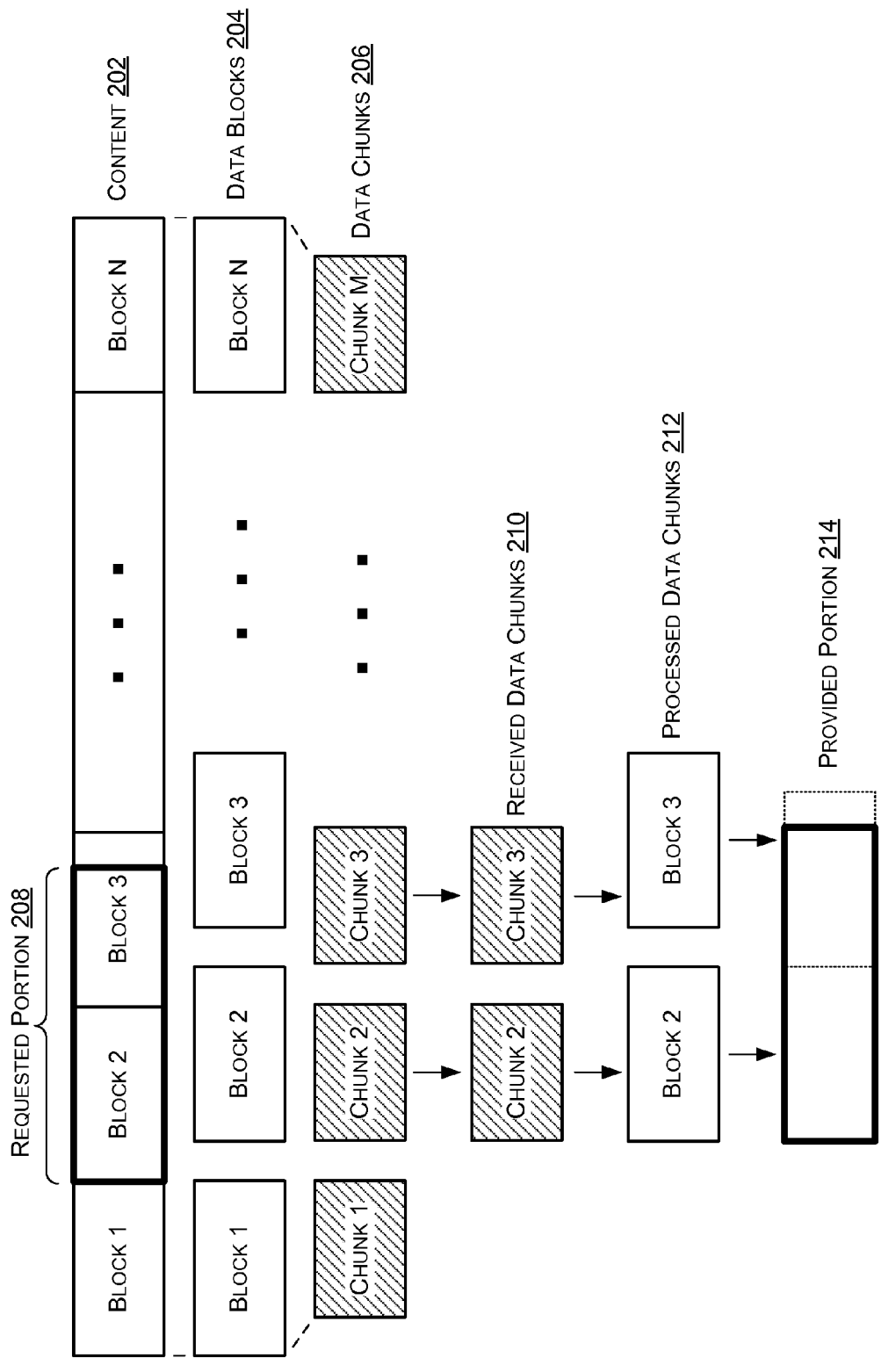
FIG. 2 illustrates exemplary content at various stages during distribution to a content requestor.

FIG. 2 illustrates an exemplary content before and after processing. Here, content 202 is divided to create data blocks 204. Thereafter, data blocks 204 are processed to create data chunks 206. In this example, data chunks 206 are illustrated as smaller in size than data blocks 204, however, data chunks 206 may be smaller than, equal to, or larger than data blocks 204.

As noted above, the processing performed at content source 104 may include creating validation information for some or all of the plurality of data blocks. Validation information may generally include information relating to validation and/or verification of the content as a whole, as groups of data blocks or chunks, or as individual data blocks or chunks. This information may be utilized to validate and/or verify that the content, and/or individual data blocks or chunks, has not be altered during distribution.

In one embodiment, the validation information includes information for each of the plurality of data blocks or chunks. For example, the validation information may include a computed hash value for each of the plurality of data blocks or chunks. In one implementation, the validation information also includes and/or identifies a hash algorithm utilized at content source 104.

During processing, or thereafter, content source 104 may also generate metadata. The metadata may indicate, or be associated with, the types of processing performed at the content source and/or an order of the processing. For example, the metadata may indicate that content source 104 compressed and encrypted the plurality of data blocks, created validation information for the plurality of data blocks, and performed processing in that order.

The metadata may also include information to decompress, decrypt, and/or validate one or more data chunks. For example, the metadata may include compression, encryption, and/or validation information. The validation information may correspond to the validation information created during processing of one or more data blocks.

Compression information may generally indicate a type of compression (e.g., a compression method), bit-rate, and/or other information associated with compressing each of the plurality of data blocks at content source 104. Meanwhile, encryption information may indicate a type of encryption (e.g., encryption method) performed at the content source 104 to encrypt the plurality of data blocks, and may include information for decryption, such as a decryption key.

The metadata may also include position, size, and/or identification information. In one example, the position, identification, and/or size information may provide information about a data block and/or data chunk when the processing creates a plurality of data chunks which have different sizes than the plurality of data blocks. This information may provide a means to identify a data block that corresponds to a data chunk or to identify a data chunk that corresponds to a data block.

Position information may generally indicate a position of some or all of the plurality of data blocks and/or data chunks with respect to the content. For instance, the position information may indicate that a particular data block or chunk is positioned in the content from KB 33 to KB 64. Meanwhile, the size information may indicate a data size for some or all of the plurality of data blocks and/or data chunks. The data size may be different or the same for each of the plurality of data blocks or chunks. For example, the size information may indicate that one or more data blocks or chunks are 32 KB in size. Identification information may generally identify a particular data block that is associated with a data chunk. For example, the identification information may include an identifier (e.g., name, index, hash, etc.) for a data chunk that is associated with a data block.

Thereafter, or during processing, the metadata may be saved to a block definition table. The metadata may be saved after a data block is processed or after a plurality of data blocks are processed. The block definition table may include one or a combination of encryption, compression, validation, position, size, and identification information for some or all of a plurality of data blocks and/or chunks. In one implementation, the block definition table includes an entry for each of the plurality of data blocks or chunks. The block definition table may be stored in a format that can be provided to one or more devices, such as an XML-based format.

After completion, the block definition table may be stored in content source 104 and/or provided to one or more other devices upon request. Content source 104 may provide an entirety of the metadata within the block definition table or portions of the metadata. The metadata may be provided in response to a request to content source 104, such as a web service call.

In one embodiment, a block definition table includes validation information in an XML-based format, and is implemented according to the following:

```
<AppxBlockTable           File="87f9a54789be48c73294="
BlockSize="32768" DigestAlgorithm="SHA2">
    <Block
    Hash="547887f9a9be48c7329487f9a54789be48c732940123=" />
    <Block
    Hash="e48c7329487f9a54789b87f9a8c73294012354789be4=" />
    <Block
    Hash="9be48c7387f9a54789be48c7f9a54782940123329487=" />
    <Block
    Hash="89be487f9a8c732547f9a54789be48c732940123ccde=" />
    ...
</AppxBlockTable>
```

In another embodiment, a block definition table includes validation, encryption, and compression information, and is implemented according to the following:

```
<AppxBlockTable           File="87f9a54789be48c73294="
BlockSize="32768" DigestAlgorithm="SHA2">
    <Block
    Hash="547887f9a9be48c7329487f9a54789be48c732940123="
        FinalSize="32768"
        SourceSize="16487"
        Encrypted="AES"
        Compressed="LZW" />
    ...
</AppxBlockTable>
```

This implementation may utilize the following schema:

```
<simpleType name="BlockDigestAlgorithm">
    <annotation>
        <documentation>A cryptographic hash algorithm
        indicating the type of digest specified for each
        logical block.</documentation>
    </annotation>
    <restriction base="token">
        <enumeration value="SHA256" />
    </restriction>
</simpleType>
<simpleType name="EncryptionAlgorithm">
    <annotation>
        <documentation>A cryptography algorithm indicating
        the type of encryption performed on each
        block.</documentation>
    </annotation>
    <restriction base="token">
        <enumeration value="none" />
        <enumeration value="AES" />
    </restriction>
```

```
</simpleType>
<simpleType name="CompressionAlgorithm">
    <annotation>
        <documentation>A compression algorithm indicating the
        type of compression performed on each
        block.</documentation>
    </annotation>
    <restriction base="token">
        <enumeration value="none" />
        <enumeration value="LZW" />
    </restriction>
</simpleType>
<complexType name="AppxBlockTableBlock">
    <attribute name="BlockSize" type="bt:positiveLong"
        use="optional" />
    <attribute name="Hash" type="base64Binary"
        use="required" />
</complexType>
<complexType name="AppxBlockTable">
    <sequence>
        <element name="Block" type="appx:AppxBlockTableBlock"
            minOccurs="1"
                maxOccurs="unbounded" />
    </sequence>
    <attribute name="FileId" type="bt:FileDigest"
        use="required" />
    <attribute name="FinalSize" type="bt:positiveLong"
        use="required" />
    <attribute name="SourceSize" type="bt:positiveLong"
        use="optional" />
    <attribute name="DigestAlgorithm"
        type="appx:BlockDigestAlgorithm" use="required" />
    <attribute name="Encrypted"
        type="appx:EncryptionAlgorithm" use="optional" />
    <attribute name="Compressed"
        type="appx:CompressionAlgorithm" use="optional" />
</complexType>
```

Meanwhile, device 102 may request and/or receive a portion of the content stored in content source 104, the block definition table, and/or a portion of the block definition table. In one aspect of this disclosure, content requestor 108 sends a request to content provider 106 requesting the portion of the content stored in content source 104, as illustrated by the arrow from content requestor 108 to content provider 106 in FIG. 1. The request may include a requested data range of the content, such as a range of bytes, bits, and/or other units. The requested data range may be less than a range of an entirety of the content.

Upon receipt of the request, content provider 106 may determine whether metadata associated with the content (e.g., block definition table) is stored in content provider 106. If it is determined that the metadata is not stored in content provider 106, content provider 106 may request and receive the metadata from content source 104. The metadata may be received directly from content source 104 or through another device or communication means. The metadata may be received in a table format and stored at content provider 106 as block definition table 114.

Thereafter, block processor 112 may reference the metadata stored within block definition table 114 and determine a list of data blocks to request from content source 104 based on the requested data range. For example, the list of data blocks may be determined based on position, size, and/or identification information associated with the content and included within the metadata. For instance, if the requested data range is for KB 33-85 of the content, block processor 112 may reference the metadata to determine which data blocks correspond to KB 33-85. Here, the metadata may indicate that the content is divided into a plurality of data blocks of size 32 KB, and may indicate that the second and third data blocks of the content include the requested portion. The second and third data blocks may then be added to the list of data blocks.

Block processor 112 may then send a request to chunk downloader 110 to obtain the list of data blocks. Chunk downloader 110 may reference the metadata stored in block definition table 114 and convert the list of data blocks into a corresponding list of data chunks. The conversion may account for differences in sizes and/or positions of data blocks with respect to sizes and/or positions of the data chunks. For instance, this conversion may account for processing performed at content source 104 which creates data chunks having sizes that are less than or greater than corresponding data blocks.

In one example, chunk downloader 110 utilizes position, size, and/or identification information included within the metadata to convert the list of data blocks into a corresponding list of data chunks. The position, size, and/or identification information may be utilized to identify one or more data chunks which correspond to a data block included within the list of data blocks. For example, the metadata may indicate that a requested data block defined by KB 33-64 within a plurality of data blocks at content source 104, is compressed and encrypted into a corresponding data chunk defined by KB 29-54 within a plurality of data chunks at content source 104.

In one embodiment, the metadata identifies one or more data chunks that correspond to a requested data block in the list of data blocks. Here, chunk downloader 110 may identify the one or more data chunks by an identifier (e.g., name, index, hash, etc.) included in the metadata.

Based on this list of data chunks, chunk downloader 110 may request each of the data chunks within the list from content source 104. In one example, chunk downloader 110 utilizes a data chunk identifier to request one or more data chunks. In response, content source 104 may provide the requested data chunks to chunk downloader 110. These data chunks may be requested and received independently, collectively, or in groups. The received data chunks may, after processing, result in blocks that collectively include more data than the requested data range. This may allow content provider 106 to account for differences between a block size and a chunk size.

FIG. 2 illustrates an exemplary requested portion 208 of content 202 and exemplary received data chunks 210. Here, requested portion 208 includes all of the data within Block 2 and a portion of the data within Block 3. Received data chunks 210 represent data chunks received at device 102 from content source 104. As illustrated, received data chunks 210 include Chunks 2 and 3 which correspond to Blocks 2 and 3 stored at content source 104.

Meanwhile, chunk downloader 110 may provide one or more of the data chunks received from content source 104 to processing engine 116. Upon receipt, processing engine 116 may perform processing on one or more of the received data chunks, such as validation, decryption, and/or decompression. The processing may be performed on a data chunk immediately after the data chunk has been received or after two or more data chunks have been received. The processing may be performed based on an order of the processing performed at content source 104. This order may be a pre-established order or may be an order indicated in the metadata stored in block definition table 114.

In one embodiment, processing engine 116 references the metadata stored in block definition table 114 to determine the processing performed at content source 104 and/or an order of the processing. Here, processing engine 116 may perform processing on the one or more received data chunks based on the determined processing and/or determined order. For instance, processing engine 116 may decrypt and/or decompress each of the received data chunks when the metadata indicates that the one or more received data chunks are compressed and/or encrypted. The decryption may be based on a decryption key which is previously stored in device 102, provided by content source 104, or provided by another device. Processing engine 116 may also validate each of the one or more received data chunks when the metadata indicates that validation information was created or when the metadata includes validation information.

Processing engine 116 may also process the one or more received data chunks based on information included within the metadata, such as validation, encryption, and/or compression information. This information may be identical to the validation, encryption, and/or compression information generated at content source 104. This information may correspond to some or all of the one or more received data chunks, and may be utilized by processing engine 116 to process the one or more received data chunks independently.

In one example, processing engine 116 validates the one or more received data chunks based on validation information. The validation process may include utilizing a computed hash value and/or hash algorithm included or indicated within the validation information. The computed hash value may be generated at content source 104 before the data chunks are provided to chunk downloader 110. Meanwhile, the hash algorithm may be indicated or included within the metadata or predefined. In one embodiment, processing engine 116 performs processing on the one or more received data chunks by validating the one or more received data chunks without decrypting or decompressing the one or more received data chunks. This may account for situations where the data chunks are not encrypted or compressed.

FIG. 2 illustrates exemplary processed data chunks 212 corresponding to received data chunks 210 which have been processed by, for example, processing engine 116. Processed data chunks 212 correspond to received data chunks 210 which have been validated, decrypted, and decompressed by processing engine 116. In this illustration, processed data chunks 212 are identical to Blocks 2 and 3 of data blocks 204. This illustrates an example in which the data chunks received at device 102 have not been altered during distribution from content source 104 to device 102.

Meanwhile, after the one or more received data chunks are processed at processing engine 116, the processed data chunks correspond to data blocks. In other words, the processing recreates the data blocks from the data chunks. These data blocks may be provided to block combiner 118 before distribution to content requestor 108.

At block combiner 118, the data blocks may be combined to form a continuous portion of the content. For instance, the data blocks may be combined such that the data blocks are ordered and/or positioned in a same order and/or position as the portion of the data in the original content stored at content source 104. The order and/or position of the data blocks may be based on the metadata stored in block definition table 114. For example, block combiner 118 may utilize position information included within the metadata to determine an order and/or position of the data blocks with respect to the original content.

In one embodiment, the combined data blocks are provided to content requestor 108 without removing and/or discarding data. This may account for a situation where the combined data blocks directly correspond to the portion of the content requested from content requestor 108.

In another embodiment, the combined data blocks are further processed before the combined data blocks are provided to content requestor 108. This embodiment may account for a situation where one or more processed data chunks 212 include more data than requested. Here, block combiner 118 removes and/or discards data of the combined data blocks that are not part of a requested portion of the content. For example, block combiner 118 may remove and/or discard data (e.g., bytes, bits, etc.) which are not within a requested data range. Block combiner 118 may utilize position, size, and/or identification information included within the metadata stored in block definition table 114. Some or all of data that is removed may be stored in a cache of device 102 and utilized later in time, such as at a time of satisfying a future request.

FIG. 2 illustrates an exemplary provided portion 214 of data which is provided to content requestor 108. Here, provided portion 214 corresponds to the portion of the content that was requested from content requestor 108 and is illustrated by the solid-lined rectangle. Provide portion 214 corresponds to Blocks 2 and 3 which have been combined and processed to remove and/or discard unrequested data.

Meanwhile, content requestor 108 may be implemented as one or more software and/or hardware components configured to request and receive content. For example, content requestor 108 may be implemented as an application of device 102 which requests a portion of content stored at content source 104. The application may include, for example, a media player, an installation application, and/or other applications configured to request content.

The techniques described above may allow, among other things, a content requestor to receive any portion of content. In addition, these techniques may allow, among other things, the portion of the content to be distributed while performing validation, encryption, and/or compression that is transparent to the content requestor. In other words, the content requestor may receive a portion of the content without involvement in and/or knowledge of processing performed on the portion of the content.

Illustrative Architecture

Figure 3:
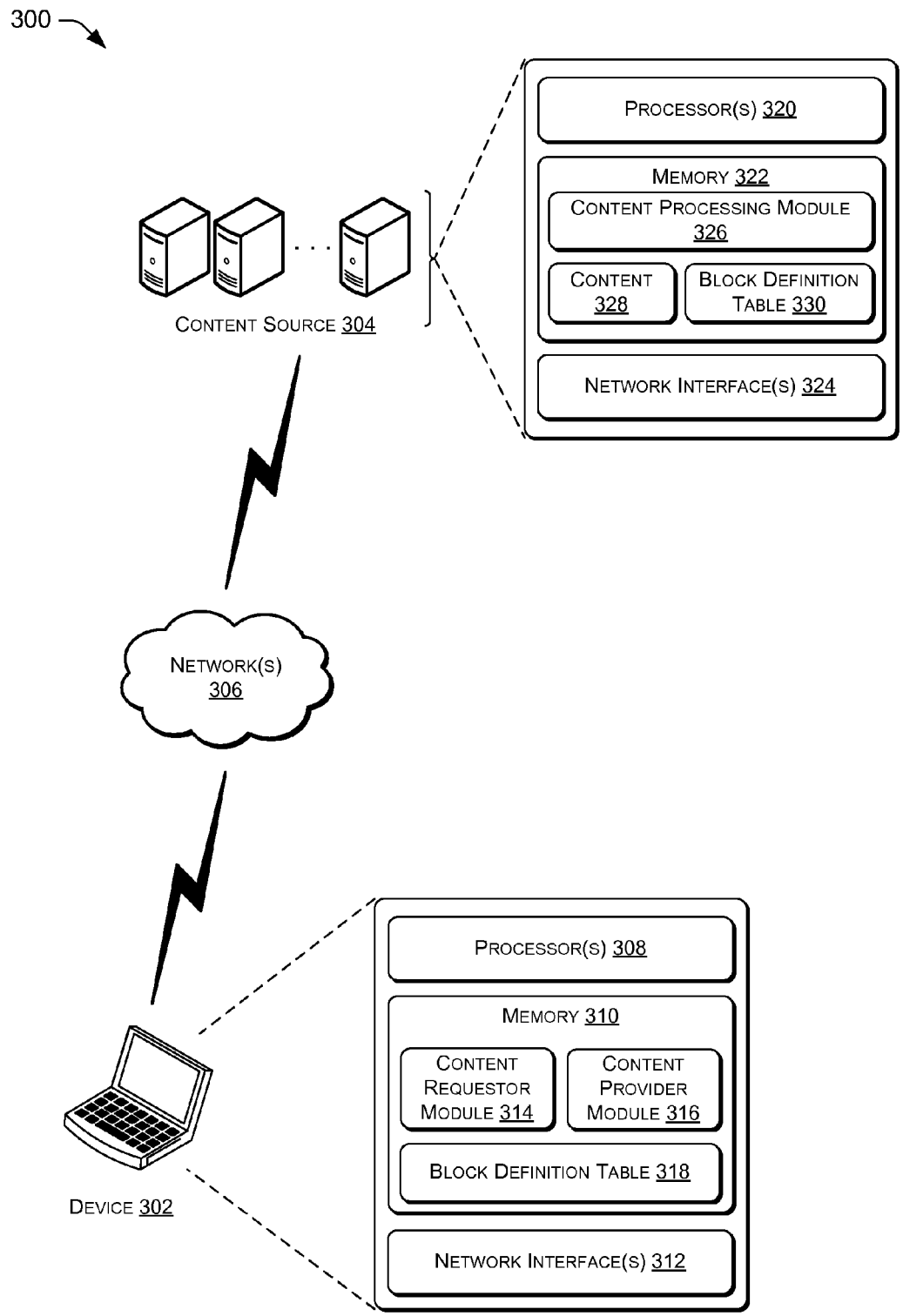
FIG. 3 illustrates an exemplary architecture usable to distribute portions of content from a content source via a content provider.

FIG. 3 illustrates an exemplary architecture 300 in which techniques described herein may be implemented. Here, the techniques are described in the context of a device 302 to communicate with a content source 304 by means of a network(s) 306. For instance, device 302 may communicate with content source 304 to provide and/or receive content and/or metadata. Device 302 may implement some or all of the techniques discussed above with respect to device 102, while content source 304 may implement some or all of the techniques discussed above with respect to content source 104.

Device 302 may include any combination of hardware and/or software resources configured to process data. Device 302 may be implemented as any number of devices including, for example, a personal computer, a laptop computer, a cell phone, a tablet device, a personal digital assistant (PDA), etc. Device 302 may be equipped with a processor(s) 308, memory 310, and a network interface(s) 312.

Memory 310 may be configured to store applications and data. An application, such as content requestor module 314 and content provider module 316, running on device 302, perform operations for requesting content and providing content. Memory 310 may also be configured to store a block definition table 318 including metadata associated with the content.

Although memory 310 is depicted in FIG. 3 as a single unit, memory 310 may include one or a combination of computer readable media. Computer readable media may include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Meanwhile, architecture 300 also includes network(s) 306 and content source 304. Network(s) 306 may include any one or combination of multiple different types of networks, such as cellular networks, wireless networks, local area networks, and the Internet. Content source 304 may include any combination of hardware and software configured to process data. Content source 304 may be implemented as any number of devices, including, for example, a server, a personal computer, a laptop computer, etc. In one example, content source 304 includes one or more servers in a data center or cloud computing environment.

Content source 304 may be equipped with a processor(s) 320, memory 322, and a network interface(s) 324. Memory 322 may include one or a combination of computer readable media. Memory 322 may be configured to store applications and data. An application, such as content processing module 326, running on content source 304 performs operations for processing content 328, such as dividing, encrypting, compressing, and/or creating validation information for content 328. Memory 322 may also be configured to store a block definition table 330 including metadata associated with content 328.

Illustrative Processes

Figure 4:
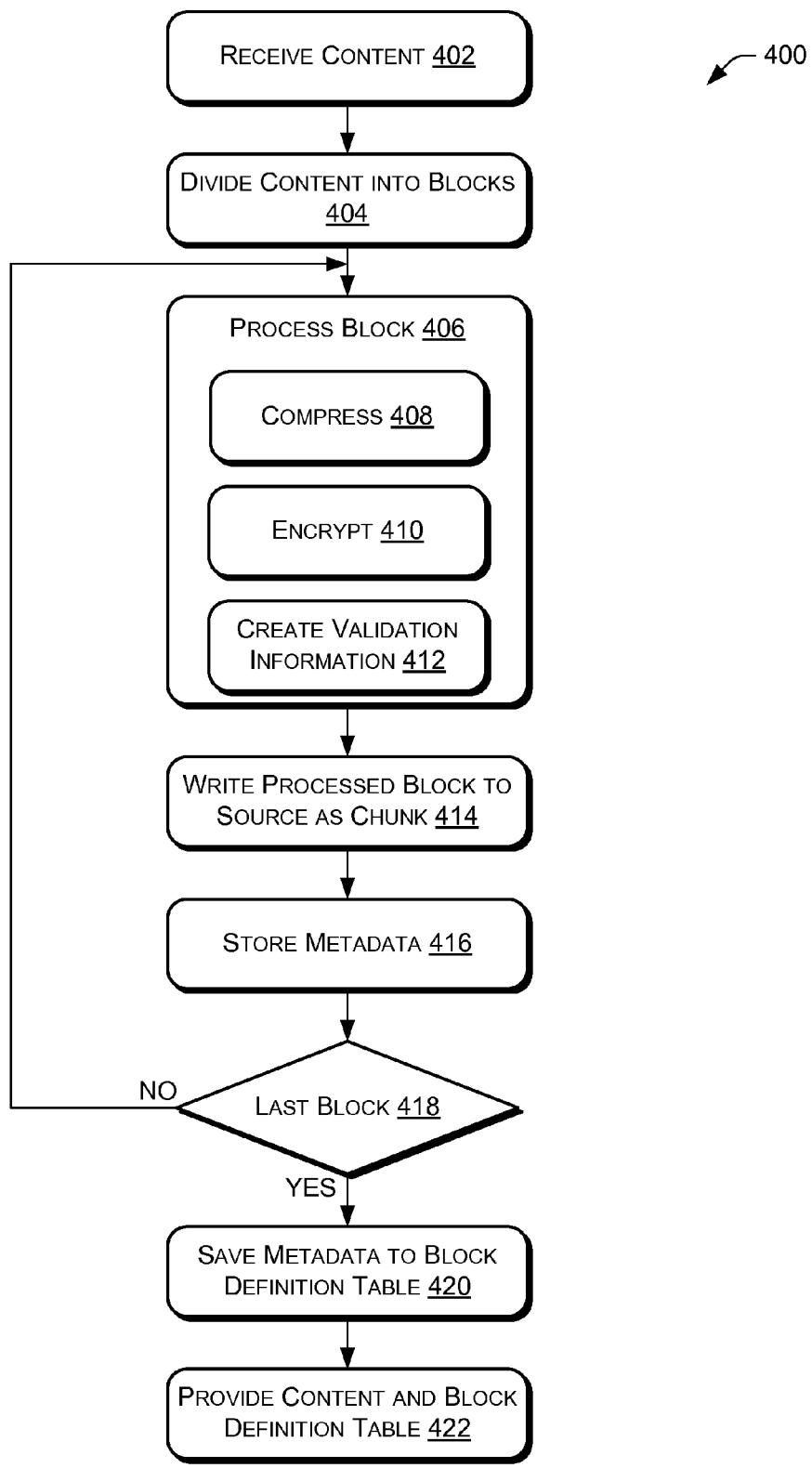
FIG. 4 illustrates an exemplary process of distributing content and/or metadata to a device.
Figure 5:
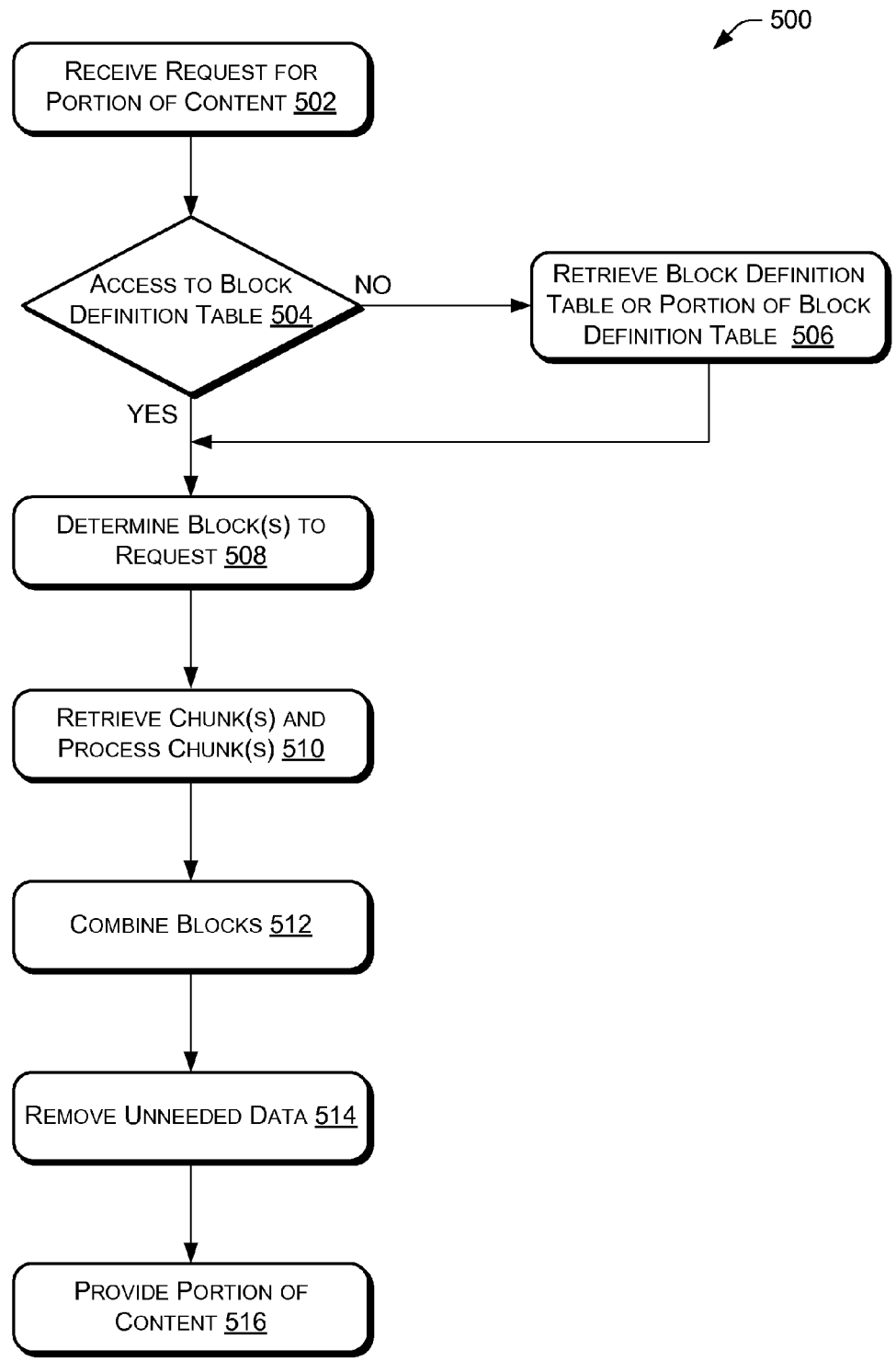
FIG. 5 illustrates an exemplary process of providing a portion of content to a content requestor.
Figure 6:
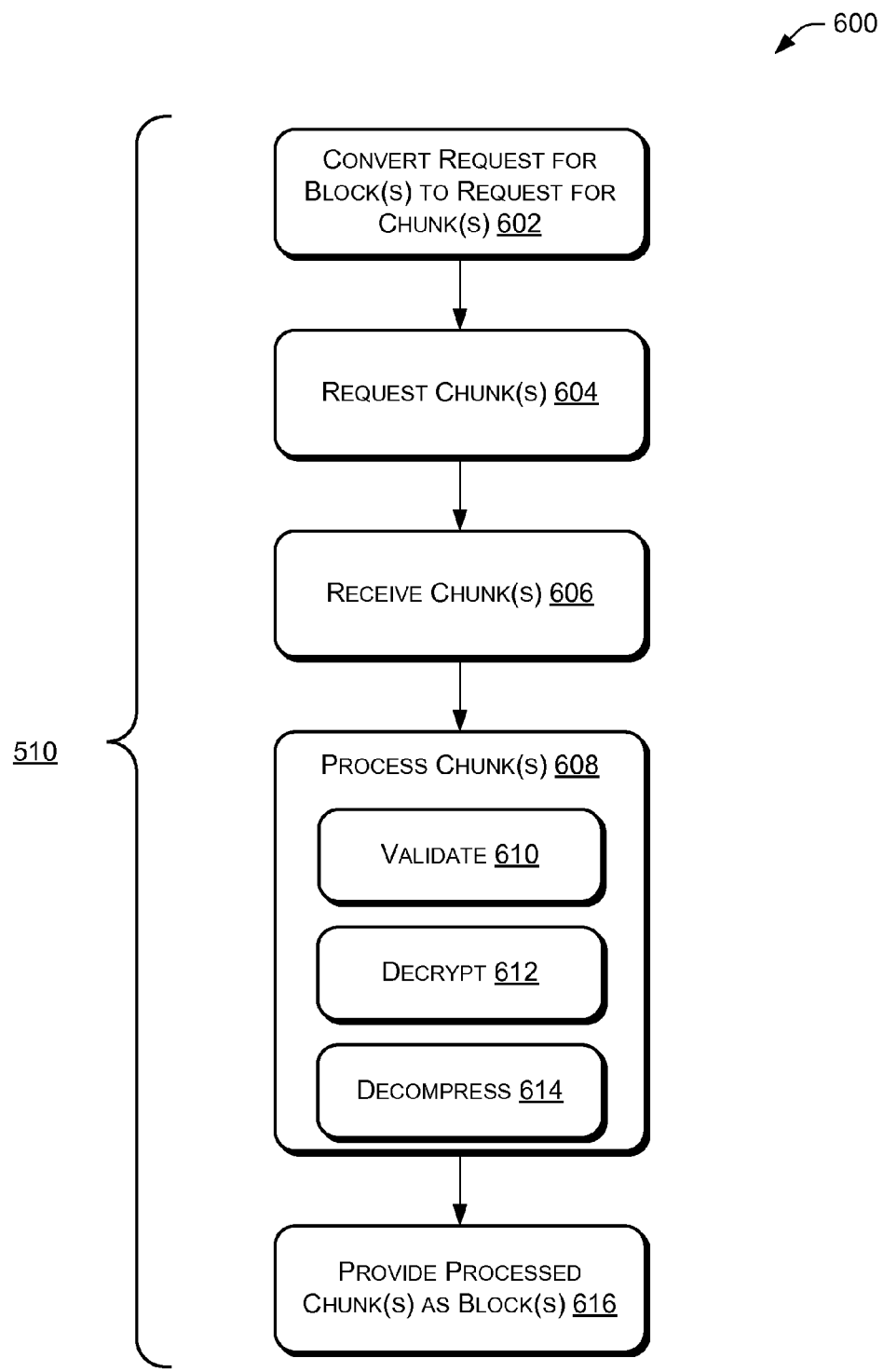
FIG. 6 illustrates an exemplary process of retrieving and processing data chunks.

The following section describes, in reference to FIGS. 4-6, exemplary processes for distributing content. Processes 400, 500, and 600 (as well as each process described herein) are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

For ease of illustration, processes 400, 500, and 600 are described as being performed in environment 100 of FIG. 1. For example, process 400 may be performed by content source 104, and processes 500 and 600 may be performed by device 102. However, processes 400, 500, and 600 may be performed in other environments. Moreover, the environment of FIG. 1 may be used to perform other processes.

Process 400 includes an operation 402 for receiving content from a device, such as a content generating device. The content may be received for distribution to one or more devices. Thereafter, process 400 may proceed to an operation 404 to divide the content into a plurality of data blocks. Process 400 may then proceed to an operation 406 for processing each of the plurality of data blocks to create a plurality of data chunks. Operation 406 may include an operation 408 for compressing one or more data blocks, an operation 410 for encrypting the one or more data blocks, and an operation 412 for creating validation information for the one or more data blocks. Operation 406 may perform one or more of operations 408, 410, and 412 in any order. During processing or thereafter, operation 406 may also generate metadata from the processing. The metadata may be associated with the one or more data blocks and/or indicate the processing performed to create the one or more data chunks.

Process 400 may also include an operation 414 for writing one or more processed data blocks to content source 104 as one or more data chunks. The processed one or more data blocks may be the one or more data blocks processed in operation 406. The writing may include storing the one or more processed data blocks into memory of content source 104. Thereafter, process 400 may proceed to an operation 416 for storing the metadata in, for example, memory of content source 104.

Process 400 may also include an operation 418 for determining whether the one or more processed data blocks are the last data blocks of the content. When it is determined that the one or more processed data blocks are the last data blocks, then process 400 proceeds to an operation 420. Alternatively, when it is determined that the one or more processed data blocks are not the last data blocks, then process 400 returns to operation 406 to perform processing on one or more further data blocks, such as the next data blocks in the content. Process 400 may perform operations 406, 414, and 416 on each of the plurality of data blocks individually, collectively, or in groups of one or more data blocks. In one embodiment, process 400 performs operations 406, 414, and 416 on each of the plurality of data blocks individually. Here, process 400 performs operations 406, 414, and 416 iteratively until a last data block of the plurality of data blocks is processed.

Process 400 may also include operation 420 for saving metadata into a block definition table. This operation may include saving metadata for some or all of the plurality of data blocks into a table in a format that may be provided to a device, such as an XML-based format. Thereafter, process 400 may proceed to an operation 422 for providing the content and block definition table to one or more devices, such as device 102. The content may be provided as one or more of the plurality of data chunks corresponding to the plurality of processed data blocks. The content and block definition table may be provided directly to a device or over one or more networks.

Meanwhile, process 500 of FIG. 5 may include operations for providing a portion of content to, for example, a content requestor. Process 500 may include an operation 502 for receiving a request for the portion of content. In one example, the request is received at content provider 106 from content requestor 108. Thereafter, process 500 may proceed to an operation 504 for determining whether the device has access to a block definition table or a necessary portion of the block definition table. When the device does not have access to the block definition table, or a necessary portion thereof, process 500 may perform an operation 506 for retrieving the block definition table, or a portion thereof, from a content source, such as content source 104. In one example, the device has access to the block definition table, or a portion thereof, when the block definition table, or portion thereof, is stored in the device. When device has access to the block definition table, or portion thereof, process 500 may perform an operation 508 for determining one or more data blocks to request from a content source, such as content source 104. This operation may include utilizing metadata stored within the block definition table.

Thereafter, process 500 may proceed to an operation 510 for retrieving one or more data chunks and processing the one or more data chunks. One example of this operation will be described in further detail with reference to FIG. 6. After performing processing on the one or more data chunks in operation 510, the one or more data chunks may correspond to one or more data blocks. Process 500 may then perform an operation 512 for combining the one or more data blocks, and an operation 514 for removing and/or discarding unneeded data from the combined data blocks. Operation 514 may include removing and/or discarding data which is not included within the requested portion of the content. Thereafter, process 500 may perform an operation 516 for providing the data resulting from operation 514 to a content requestor, such as content requestor 108. This data may be provided as the requested portion of the content.

Meanwhile, process 600 of FIG. 6 may include operations for retrieving and processing one or more data chunks, which may be performed in operation 510 of FIG. 5. For example, process 600 may include an operation 602 for converting a request for one or more data blocks into a request for one or more data chunks. In converting the request, operation 602 may utilize metadata stored within a block definition table, such as position, size, and/or identification information included within block definition table 114. Thereafter, process 600 may proceed to an operation 604 for requesting the one or more data chunks from a content source, such as content source 104. Process 600 may also include an operation 606 for receiving the one or more data chunks from the content source.

In response to receiving the one or more data chunks, process 600 may perform an operation 608 for processing some or all of the received one or more data chunks. Operation 608 may include an operation 610 for validating some or all of the received one or more data chunks, an operation 612 for decrypting some or all of the received one or more data chunks, and an operation 614 for decompressing some or all of the received one or more data chunks. Operations 610, 612, and 614 may be performed in any order and may be performed based on the metadata stored in the block definition table, such as validation, encryption, and/or compression information of the metadata. In one example, operations 610, 612, and 614 are performed based on the order of the processing performed at the content source. This order may be an implicit, predefined, or explicit order. Thereafter, process 600 may proceed to an operation 616 for providing the processed one or more data chunks as one or more data blocks. The one or more data blocks may be provided to a block combiner, such as block combiner 118. In one example, process 600 proceeds to operation 512 after performing operation 616.

Conclusion

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

The invention claimed is:

1. A client device, comprising:
one or more processors; and
memory, communicatively coupled to the one or more processors, storing one or more modules configured to:
  receive, from an application of the client device, a request for a range of bytes of content that is stored at a content source, the range of bytes being equal to or less than a byte range of an entirety of the content;
  determine one or more data blocks associated with the range of bytes of content to request from the content source;
  convert the request for the one or more data blocks into a request for one or more data chunks associated with the range of bytes of content, the one or more data chunks comprising the one or more data blocks that have been processed;
  request the one or more data chunks from the content source;
  receive the one or more data chunks from the content source;
  process the one or more data chunks by at least one of validating, decrypting, or decompressing the one or more data chunks;
  re-create, responsive to processing the one or more data chunks, the one or more data blocks from the one or more data chunks to create re-created one or more data blocks;
  combine the re-created one or more data blocks;
  remove portions of the re-created one or more data blocks to create refined one or more data blocks that correspond to the requested range of bytes of the content; and
  provide the refined one or more data blocks to the application of the client device as the requested range of bytes of the content.

2. A method implemented by a device, comprising:
receiving, at the device, a request for a portion of content being stored in a content source as a plurality of data chunks, the request indicating a data range of the content;
receiving, at the device, metadata from the content source, the metadata indicating processing performed at the content source on a plurality of data blocks to create the plurality of data chunks;
requesting, by the device, one or more data chunks of the plurality of data chunks from the content source based on the data range and the metadata;
receiving, at the device, the one or more data chunks from the content source;
processing, at the device, the one or more data chunks into one or more data blocks of the content, the processing comprising:
  at least one of validating, decrypting, or decompressing the one or more data chunks;
  creating, responsive to processing the one or more data chunks, the one or more data blocks from the one or more data chunks; and
  removing data from the one or more data blocks that is not part of the data range; and
providing, by the device, the one or more data blocks as the portion of the content.

3. The method of claim 2, wherein the receiving the request includes receiving the request for the portion of the content from an application of the device.

4. The method of claim 2, further comprising:
before receiving the metadata, determining that the metadata indicating processing performed at the content source is not stored in the device; and
requesting the metadata from the content source.

5. The method of claim 2, wherein the processing the one or more data chunks includes processing the one or more data chunks based on the metadata.

6. The method of claim 2, wherein:
the metadata includes validation information for the plurality of data chunks; and
the processing the one or more data chunks includes validating the one or more data chunks based on the validation information included in the metadata.

7. The method of claim 6, wherein:
the validation information includes at least one of a computed hash value for the plurality of data chunks or a hash algorithm utilized at the content source; and
the processing the one or more data chunks includes validating the one or more data chunks based on at least one of the computed hash value or the hash algorithm.

8. The method of claim 2, wherein the metadata includes validation information, encryption information, and compression information for the plurality of data chunks, and
the processing the one or more data chunks includes:
validating the one or more data chunks with the validation information;
decrypting the one or more data chunks with the encryption information; and
decompressing the one or more data chunks with the compression information.

9. The method of claim 2, wherein the metadata includes position information, size information, and identification information for at least one of the plurality of data blocks or the plurality of data chunks,
the position information indicating a position of the at least one of the plurality of data blocks or the plurality of data chunks with respect to the content,
the identification information identifying a data block that is associated with a data chunk, and
the size information indicating a data size of the at least one of the plurality of data blocks or the plurality of data chunks.

10. The method of claim 9, further comprising:
determining, in response to receiving the request for the portion of content, a list of data blocks based on the data range and at least one of the position information, size information, or identification information; and
converting the list of data blocks to a list of data chunks based on at least one of the position information, size information, or identification information.

11. The method of claim 2, further comprising:
combining, before removing the data from the one or more data blocks, the one or more data blocks to create combined one or more data blocks corresponding to the portion of the content;
removing the data from the combined one or more data blocks; and
providing the combined one or more data blocks as the portion of the content.

12. The method of claim 2, wherein:
the content comprises an application to be installed on the device; and
the receiving the request includes receiving a request for a portion of the application from an installation application of the device.

13. The method of claim 2, wherein:
the content comprises media data to be reproduced on the device; and
the receiving the request includes receiving a request for a portion of the media data from a media application configured to reproduce the media data.

14. One or more computer storage media storing computer-readable instructions that, when executed by a computing device having one or more processors, instruct the one or more processors to perform operations comprising:
receiving a request for a portion of content, the content being stored in a content source as a plurality of data chunks, the request indicating a data range of the content;
receiving metadata from the content source, the metadata indicating processing performed at the content source on a plurality of data blocks to create the plurality of data chunks;
requesting one or more of the plurality of data chunks from the content source based on the data range and the metadata;
receiving the one or more data chunks of the plurality of data chunks from the content source;
processing the received one or more data chunks into one or more data blocks of the content, the processing comprising:
at least one of validating, decrypting, or decompressing the one or more data chunks;
creating, responsive to processing the one or more data chunks, the one or more data blocks from the one or more data chunks; and
removing data from the one or more data blocks that is not part of the data range; and
providing the one or more data blocks as the portion of the content.

15. The one or more computer storage media of claim 14, wherein the receiving the request includes receiving the request for the portion of content from an application of the computing device.

16. The one or more computer storage media of claim 14, wherein the operations further comprise:
before receiving the metadata, determining that the metadata indicating processing performed at the content source is not stored in the computing device; and
requesting the metadata from the content source.

17. The one or more computer storage media of claim 14, wherein the processing the one or more data chunks includes processing the one or more data chunks based on the metadata.

18. The one or more computer storage media of claim 14, wherein:
the metadata includes validation information for the plurality of data chunks; and
the processing the one or more data chunks includes validating the one or more data chunks based on the validation information included in the metadata.

19. The one or more computer storage media of claim 14, wherein:
the validation information includes at least one of a computed hash value for the plurality of data chunks or a hash algorithm utilized at the content source; and
the processing the one or more data chunks includes validating the received one or more data chunks based on at least one of the computed hash value or the hash algorithm.

20. The one or more computer storage media of claim 14, wherein the metadata includes validation information, encryption information, and compression information for the plurality of data chunks, and the processing the received one or more data chunks includes:

validating the one or more data chunks with the validation information;

decrypting the one or more data chunks with the encryption information; and decompressing the one or more data chunks with the compression information.

* * * * *